United States Patent [19]
Gorog et al.

[11] 3,912,386
[45] Oct. 14, 1975

[54] COLOR IMAGE INTENSIFICATION AND PROJECTION USING DEFORMABLE MIRROR LIGHT VALVE

[75] Inventors: Istvan Gorog, Princeton; Arthur Herbert Firester, Skillman, both of N.J.

[73] Assignee: RCA Corporation, New York, N.Y.

[22] Filed: June 14, 1974

[21] Appl. No.: 479,527

[52] U.S. Cl. ............................. 353/122; 350/161
[51] Int. Cl.$^2$.. G03B 21/00; G02B 5/23; G02F 1/23
[58] Field of Search .................... 353/120, 122, 25; 350/162 SF, 162 ZP, 161

[56] References Cited
UNITED STATES PATENTS

| | | | |
|---|---|---|---|
| 3,306,160 | 2/1967 | Dimhobel | 350/161 |
| 3,561,859 | 2/1971 | Heckscher | 350/162 SF |
| 3,702,725 | 11/1972 | Macoushi | 350/165 SF |

FOREIGN PATENTS OR APPLICATIONS

| | | | |
|---|---|---|---|
| 808,981 | 2/1959 | United Kingdom | 350/161 |

Primary Examiner—Richard E. Aegerter
Assistant Examiner—A. Jason Mirabito
Attorney, Agent, or Firm—Edward J. Norton; Carl V. Olson

[57] ABSTRACT

A color image intensifier and projector includes a reflective light valve lamination having, in order, a flexible conductive mirror, a deformable layer, a photoconductive layer, a transparent conductive layer, and a plurality of optical diffraction gratings each for a different color. An electric potential is applied across the flexible conductive mirror and the transparent conductive layer to bias the photoconductive layer. When an input colored image is projected through the gratings to the photoconductive layer, the resulting electric fields cause the deformable layer and flexible conductive mirror thereon to be deformed in accordance with the colored image as modified by the diffraction gratings. A Schlieren optical system is included to direct light from a source to the flexible conductive mirror, and to collect reflected light and direct it through a fourier transform plane to a utilization plane. A color-decoding spatial filter is located in the fourier transform plane to recreate the color image at the utilization plane.

8 Claims, 7 Drawing Figures

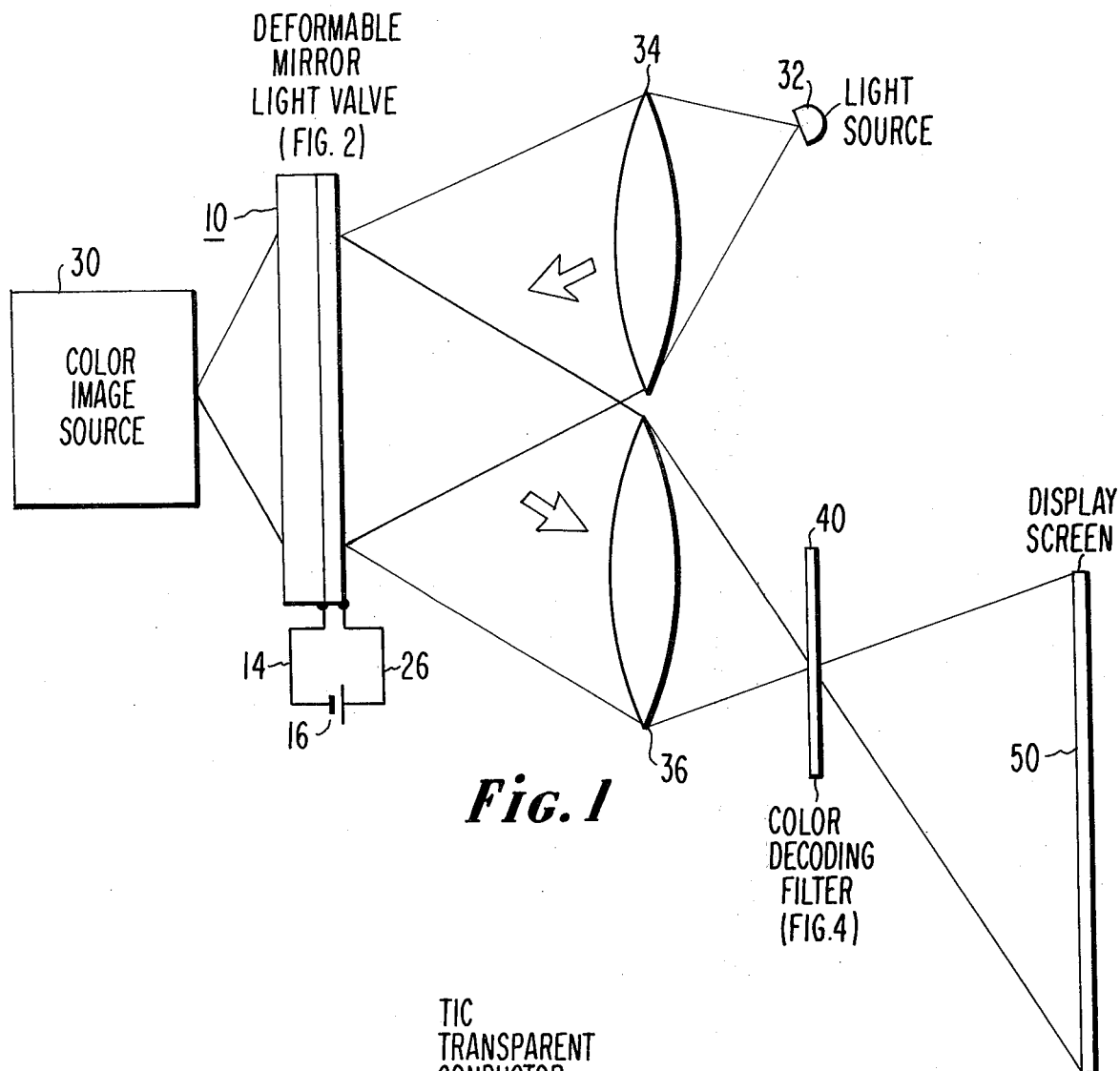
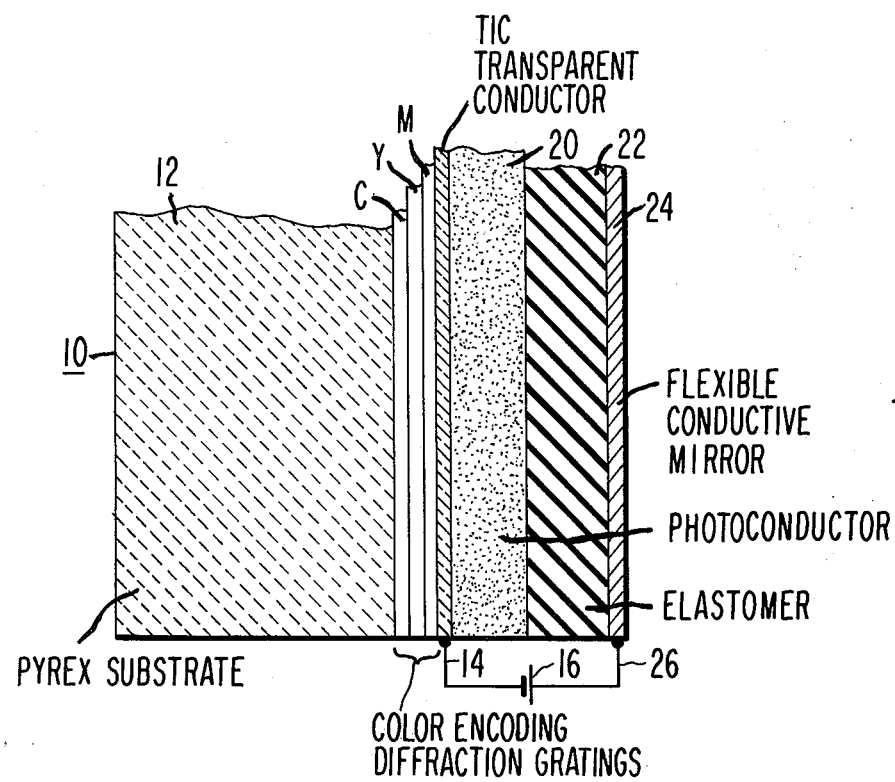

COLOR IMAGE INTENSIFICATION AND PROJECTION USING DEFORMABLE MIRROR LIGHT VALVE

BACKGROUND OF THE INVENTION

The display of changing information is commonly accomplished by means of a cathode ray tube in which the cathode ray is modulated with the information and deflected to scan a phosphor screen. When a large size display is desired, it is impractical to consider an evacuated envelope having a screen larger than, say, 3 feet square. Therefore, it has been proposed to construct displays including a modulated and deflected laser light beam, rather than a cathode ray. However, a scanned laser beam display on a passive screen of large size is limited in brightness and color by the amount and quality of light energy obtainable from suitable lasers. An active display screen may be used which includes an image amplifier to which electrical energy is supplied to make the image as bright as desired. However, image amplifiers of large size are perhaps as difficult and expensive to construct as large cathode ray tubes.

A color image intensifying and projection system is needed, having components of reasonable size, which is capable of projecting an image onto a passive screen of any desired size. It is known that a weak image can be directed to a photoconductive layer in a deformable mirror light valve to control the light from a powerful light source. The light reflected from the deformable mirror light valve is projected onto a large display screen to recreate the input image in enlarged and intensified form. Such an arrangement is described in U.S. Pat. No. 2,896,506, "Arrangement for Amplifying the Light Intensity of An Optically Projected Image," issued on Jul. 28, 1959, to F. Mast et al. The input image may be projected at once to the photoconductive layer of the light valve from a photographic transparency. Alternatively, the input image may be provided by a modulated laser beam which is raster scanned in television fashion onto the photoconductive layer. Known arrangements are capable of intensifying and projecting simple black and white images, but not color images.

SUMMARY OF THE INVENTION

The intensification and projection of color images is accomplished by means of a deformable mirror light valve to which an input color image is applied through a plurality of optical diffraction gratings each for a different color. The gratings for different colors have different angular orientations of different spacings, or both. An appropriate color decoding filter located in the fourier transform plane of a Schlieren optical system causes a recreated color image at a utilization plane.

BRIEF DESCRIPTION OF THE DRAWING

FIG. 1 is a diagram showing a color image intensifying and projecting system constructed according to the teachings of the invention;

FIG. 2 is a sectional view of a small portion of the deformable mirror light valve included in the system of FIG. 1;

DESCRIPTION OF THE PREFERRED EMBODIMENT

Figure 3:
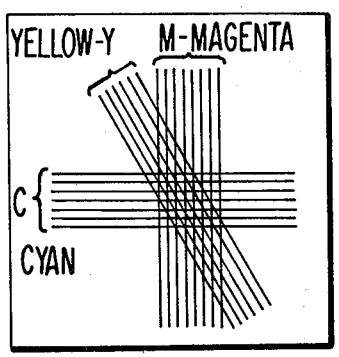
FIG. 3 is a diagram illustrating the angular orientations of three overlapping color-encoding diffraction gratings useful in the deformable mirror light valve in the system of FIG. 1.

The color image intensifying and projecting system shown in FIG. 1 includes a deformable mirror light valve 10 onto one side of which a small, low-intensity color image is projected from a source 30. The source 30 may comprise a laser producing a light beam, and means for modulating the beam by a video signal, and means for raster scanning or deflecting the beam back and forth in television fashion across the image input surface of the light valve 10. Alternatively, the color image source 30 may comprise a color slide projector.

The system of FIG. 1 also includes a Schlieren optical system comprising a powerful light source 32 from which light is directed by means of lens 34 to the deformable mirror surface of light valve 10. A lens 36 collects light reflected from the light valve 10 and directs it through a fourier transform plane occupied by a color decoding filter 40 to a utilization plane which may be occupied by a display screen 50.

FIG. 2 shows the laminated construction of the deformable mirror light valve 10 in the system of FIG. 1. The valve 10 includes a substrate 12 which may be of "Pyrex" glass. Three overlapping color-encoding diffraction gratings C, Y and M, for cyan, yellow and magenta colors, are arranged on the substrate. The diffraction gratings may, as represented in FIG. 3, include a large number of horizontal cyan filter strips C, a large number of vertical magenta strips M, and a large number of diagonal yellow filter strips Y. The three described sets of filter strips are in the three subtractive primary colors. The color filter strips occupy the entire effective area of the light valve 10, although only a limited number of filter strips are included for reasons of clarity in the drawings. The filter strips of each color are preferably very thin and close together to preserve image definition. There may be about three hundred parallel filter strips of one color per inch. Or, the strips may have a period of 10 microns if possible, or otherwise about 25 microns. The yellow filter strips Y are shown disposed at 30° and 60° angles with the magenta and cyan filter strips, respectively. The particular angular relationships shown are advantageous, but not essential.

The next layer in the light valve lamination in FIG. 2 is a transparent conductor T1C made of a conductive thin film of a material such as sputtered tin oxide and idium oxide, and provided with an electrical connection 14 to a source, such as a battery 16, of biasing potential.

The following layer in the light valve is a photoconductor layer 20 which may be any suitable photoconductor such as cadmium sulfide, cadmium selenide, lead sulfide, or the like, having a region of radiation sensitivity appropriate to the light source 30 in the system. The light source 30 should include white light having components passed by the color filters in the colorencoding diffraction gratings C, Y and M.

A preferred photoconductor layer 20 is poly (N-vinylcarbazole) doped with trinitrofluorenone, and then deposited on the transparent conductor layer T1C from a solution of poly (N-vinylcarbazole) and a suitable solvent such as 1, 1, 2-tri-chloroethane, commercially available from Eastman Kodak.

Next there is a deformable elastomer layer 22 made of a room temperature curing rubber, such as RTV silicone rubber which is commercially available from General Electric as RTV 602, and which is mixed with a diluent and a catalyst and deposited on the photoconductor layer 20.

Finally, the light valve includes a flexible conductive mirror 24 which may be a deposited (evaporated) gold layer providing good adhesion to the elastomer layer and providing good optical isolation. A typical gold thickness is 2,000 to 3,000 A. The mirror 24 may also include a layer of indium evaporated onto the layer of gold to provide improved reflectivity and ductility. The indium may have a thickness of about 1,000 A. The flexible conductive mirror 24 is connected by a conductor 26 to the other terminal of the battery 16. More detailed information on the construction of a useful deformable mirror light valve lamination is contained in a patent application Ser. No. 444,098 for "Deformable Mirror Light Valve and Method of Making the Same," filed by W. R. Roach on Feb. 20, 1974, and assigned to the assignee of this present application.

Figure 4:
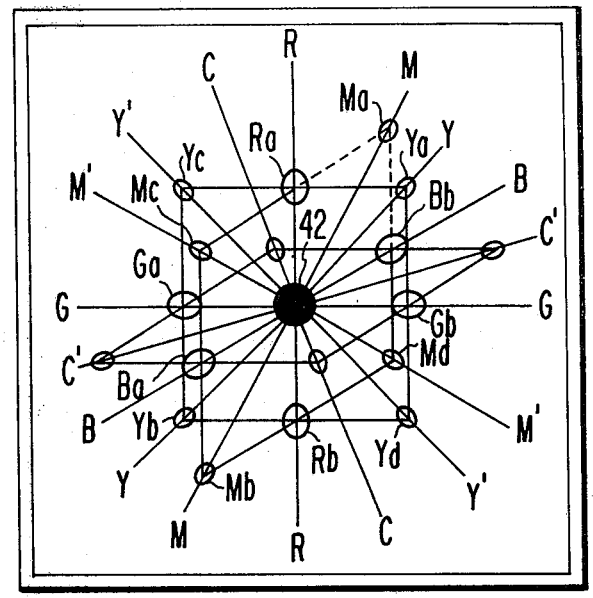
FIG. 4 is a diagram illustrating a color decoding filter useful in the fourier transform plane in the system of FIG. 1.

Reference is now made to FIG. 4 for a description of the color filter 40 used in the fourier transform plane in the projection system of FIG. 1. The filter 40 preferably comprises a transparent support for a central opaque spot 42 and a plurality of color filter spots or areas. Two red filter spots, R$a$ and R$b$, are located on a radial axis R—R which is orthogonal to, or perpendicular with, the cyan diffraction grating C in the coding filter 13 of FIG. 3. The decoding color filter 40 of FIG. 4 also includes green spots, G$a$ and G$b$, along an axis orthogonal to the magenta grating M in FIG. 3, and blue color filter spots B$a$ and B$b$ along axis B—B which is orthogonal to the yellow diffraction grating Y in FIG. 3. There are also second order spots further out radially along the red, blue and green axes where respective color filters may be placed. However, the amount of separated color energy at these points may not be enough to justify the use of filters at these locations.

Additional color filters are employed at spots where sum and difference products of the red, blue and green information, taken two at a time, are present. For example, magenta color filters M$a$ and M$b$ are positioned along a magenta axis M—M which bisects the angle between color axes R—R and B—B. The color filter M$a$ is located at the corner of a parallelogram having the central opaque spot 30 at its opposite corner, and having the color filters R$a$ and B$b$ at the remaining opposite corners. The magenta filter M$a$ is located at a point at which light energy representing a mixture of red and blue color information is present, and is utilized to improve the brightness and color fidelity of the displayed image. The inclusion of the magenta filter also permits a saturated magenta color to be created on the utilization device. Another two magenta color filters, M$c$ and M$d$, are similarly arranged along an orthogonal axis M'—M', so that light passing through all four of the magenta filters contributes to the creation of magenta color on the utilization device.

In a similar manner, yellow filters Y$a$, Y$b$, Y$c$, and Y$d$ are positioned along axes Y—Y and Y'—Y' to utilize yellow information due to the sum and difference products resulting from the mixture of energy along the red and green axes. Additionally, color filters are provided at appropriately indicated spots along axes C—C and C'—C' to utilize energy resulting from the mixture of blue and green energy.

It will be understood that the primary colors red, blue and green, and the subtractive primary colors cyan, yellow and magenta, have been chosen for purposes of illustration, and that other appropriately related colors may be employed. It will also be understood that the angles between the color encoding phase gratings on the film 13 may be varied if desired, and that this will effect the geometric positioning of the different colored filters in the decoding filter 20.

The color encoding diffraction gratings need not all be at different angles as shown in FIG. 3, but may instead be constructed of parallel gratings having different spacings of the lines for different colors. Of course, the construction of the decoding filter 40 must be adapted to the resulting different spatial distribution of colored light in the fourier transform plane.

Figure 5:
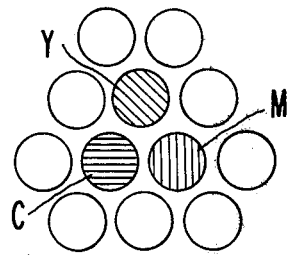
FIG. 5 is a diagram illustrating non-overlapping color-encoding diffraction gratings having different angular orientations for the different colors.
Figure 6:
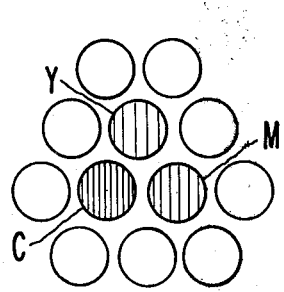
FIG. 6 is a diagram illustrating non-overlapping color-encoding diffraction gratings having different line spacings for the different colors.
Figure 7:
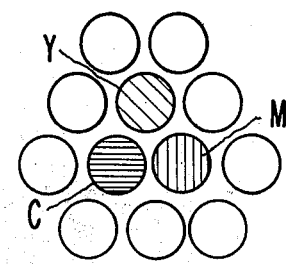
FIG. 7 is a diagram illustrating non-overlapping color-encoding diffraction gratings having different line orientations and spacings for the different colors.

The above-described additional color filters (employed at spots where the sum and difference products of the red, blue and green information, taken two at a time, are present) are useful because the overlapped and crossed diffraction gratings shown in FIG. 3 produce the sum and difference cross modulation products at the indicated places in the fourier transform plane. These cross modulation products are absent when the three color encoding diffraction gratings are non-overlapping as shown in FIGS. 5, 6 and 7. When these color encoding gratings are employed in the light valve 10, the color decoding filter 40 located in the fourier transform plane can decode all the useful light with apertures or filters located solely along the R—R, G—G and B—B axis of the filter in FIG. 4.

When the color encoding diffraction gratings in the light valve are built by means of non-overlapping color encoded gratings, the construction of encoding region is somewhat similar to the faceplate of a shadow mask type of color kinescope. The encoding plane is divided into a number of encoding regions, smaller than a picture element, i.e., to each picture elements there corresponds a plurality of color encoding regions. Each of these regions could, for example, be constructed by the superposition of a color filter and a black and white grating. The spatial wavelength and/or their orientation distinguishes the gratings corresponding to the various primary colors. The grating frequencies are chosen to be sufficiently high with respect to the spatial frequency content of the image and to be sufficiently widely spaced to allow proper color separation, but all of the carriers must be clustered sufficiently close for all to fall, together with their information carrying side bands, within the pass band of the deformable mirror 24.

The non-overlapped gratings illustrated in FIG. 5 have lines of equal spacings and different angles for the different colors. The gratings in FIG. 6 have lines which are parallel to each other but have unequal spacings for the different colors. And, the gratings in FIG. 7 have lines which have both different spacings and different angles. The arrangements shown in FIGS. 6 and 7 require a decoding filter which is appropriately different from the one shown in FIG. 4.

In the operation of the deformable mirror light valve 10 in the Schlieren optical system shown in FIG. 1, the color image source 30 projects a color image through the substrate 12, the color encoding diffraction gratings and the transparent conductor T1C to the photoconductor 20 of the light valve 10. A biasing source 16 is connected across the transparent conductor layer T1C and the flexible conductive mirror 24 of the deformable mirror light valve 10. At each point where the addressed image light strikes the photoconductor layer 20, electron-hole pairs are generated. The pairs are separated by the electric field produced by the biasing voltage thereby causing the mirror 24 and the elastomer layer 22 of the deformable mirror light valve 10 to deform.

In the absence of an input image and a consequent lack of a deformation of the flexible mirror 24, the light from source 32 is reflected by the flexible mirror 24 to the Schlieren stop 42 in the center of the color decoding filter 40 shown in FIG. 4. In the presence of an input image and a consequent deformation of the flexible mirror 24, the light from source 32 is reflected and diffracted along paths displaced from the Schlieren stop 42 and through apertures or color filters located as shown in FIG. 4. An intensified and enlarged color image is then recreated on the display screen 50 in the utilization plane. The input color image in going to the photoconductor 20 through the color encoding diffraction gratings C, Y, and M causes the flexible conductive mirror to be deformed in a complex pattern which reflects light from source 32 so that the color image is reproduced at the screen 50 in intensified and enlarged form.

The described system can also be used for "false color" imaging. For example, by adjusting the optical absorption properties of the color encoding filters so that they respond to different spectral regions in the near infrared, and simultaneously adjusting the Schlieren optics and spatial frequencies of the light diffracting strips so that a particular near infrared spectral band is reproduced as a visible spectral band, a "false color" image converter and/or intensifier can be constructed. Such a device can be used for aerial survey, and military, medical and industrial infrared imaging. The same concept can be extended to any spectral region in which the photoconductor is sensitive.

What is claimed is:

1. A color image intensifier and projector, comprising
   a light valve including, in order, a flexible conductive mirror, a deformable layer, a photoconductive layer, a transparent conductive layer, and a plurality of optical diffraction gratings each for a different color,
   means to apply an electric potential across said flexible conductive mirror and said transparent conductive layer,
   means to project an input color image through said gratings to said photoconductive layer, whereby said deformable layer and flexible conductive mirror thereon can be deformed in accordance with the color image as modified by the diffraction gratings,
   a Schlieren optical system including means to direct light from a source to said flexible conductive mirror, and means to collect reflected light and direct it through a fourier transform plane to a utilization plane, and
   a spatial filter located in said fourier transform plane and having a pattern to recreate the color image at said utilization plane.

2. The combination as defined in claim 1 wherein the optical gratings for the different colors comprise spaced lines of corresponding different colors oriented at different angles.

3. The combination as defined in claim 1 wherein the optical gratings for the different colors comprise spaced lines of corresponding different colors and having different spacings.

4. The combination as defined in claim 1 wherein the optical gratings for the different colors comprise different color lines at different angles and having different spacings.

5. The combination as defined in claim 2 wherein the gratings for the different colors overlap.

6. The combination as defined in claim 1 wherein the grating elements for each color are non-overlapping in relation to grating elements for the other colors.

7. The combination as defined in claim 1 wherein said spatial filter consists of apertures positioned to pass diffracted light of predetermined different colors.

8. The combination as defined in claim 1 wherein said spatial filter consists of colored filters positioned to pass diffracted light of predetermined different colors, and also components of the predetermined different colors included in nearby-positioned light of mixed colors.

* * * * *